(12) United States Patent
Inoshita (10) Patent No.: US 11,866,197 B2
(45) Date of Patent: Jan. 9, 2024

(54) TARGET MEMBER

(71) Applicant: NEC CORPORATION, Tokyo (JP)

(72) Inventor: Tetsuo Inoshita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 698 days.

(21) Appl. No.: 16/980,239

(22) PCT Filed: Mar. 13, 2018

(86) PCT No.: PCT/JP2018/009827
§ 371 (c)(1),
(2) Date: Sep. 11, 2020

(87) PCT Pub. No.: WO2019/175993
PCT Pub. Date: Sep. 19, 2019

(65) Prior Publication Data
US 2021/0031945 A1 Feb. 4, 2021

(51) Int. Cl.
*G05D 1/10* (2006.01)
*B64C 39/02* (2023.01)
*B64U 70/00* (2023.01)
*B64F 1/18* (2006.01)
*B64U 101/30* (2023.01)

(52) U.S. Cl.
CPC ............... *B64F 1/18* (2013.01); *G05D 1/101* (2013.01); *B64C 39/024* (2013.01); *B64U 70/00* (2023.01); *B64U 2101/30* (2023.01)

(58) Field of Classification Search
CPC ........... B64F 1/18; G05D 1/101; B64U 70/00; B64U 2101/30

USPC ........................................................ 340/953
See application file for complete search history.

(56) References Cited

U.S. PATENT DOCUMENTS

| 2014/0070052 A1 | 3/2014 | Kang |
| 2016/0122038 A1 | 5/2016 | Fleischman et al. |
| 2021/0197725 A1* | 7/2021 | Imamura .................. B60R 1/08 |

FOREIGN PATENT DOCUMENTS

| GB | 2513912 | * | 5/2013 |
| JP | 2012-071645 A | | 4/2012 |
| JP | 2012-232654 A | | 11/2012 |
| JP | 2015-149013 A | | 8/2015 |
| JP | 2016-524214 A | | 8/2016 |

(Continued)

OTHER PUBLICATIONS

International Preliminary Report on Patentability with a Translation of Written Opinion in International Application No. PCT/JP2018/009827, dated Sep. 15, 2020.

(Continued)

*Primary Examiner* — Ted M Wang (57) ABSTRACT

Provided is a target member for accurately guiding a moving body to a target site. A target member 10 is used when performing control for guiding a moving body 20 to a target site, and the target member 10 is formed by using two or more different feature members 11, 12 that are set such that a shape of a target member image 44 that corresponds to the target member 10 captured by an image capturing unit 21 (an image capturing apparatus) that is mounted in the moving body 20 changes according to a measurement distance that indicates a distance between the target member 10 and the moving body 20.

5 Claims, 4 Drawing Sheets

(56) References Cited

FOREIGN PATENT DOCUMENTS

| JP | 2017-534869 A | 11/2017 |
| WO | 2016/103562 A1 | 6/2016 |

OTHER PUBLICATIONS

Japanese Office Communication for JP Application No. 2020-506008 dated Jan. 18, 2022 with English Translation.
Japanese Office Action for JP Application No. 2020-506008 dated Aug. 3, 2021 with English Translation.
International Search Report of PCT/JP2018/009827 dated May 15, 2018.

* cited by examiner

IMAGE CAPTURED FROM FIRST ALTITUDE L1:40

IMAGE CAPTURED FROM SECOND ALTITUDE L2:41

IMAGE CAPTURED FROM THIRD ALTITUDE L3:42

Fig.4

TARGET MEMBER

CROSS REFERENCE TO RELATED APPLICATIONS

This application is a National Stage of International Application No. PCT/JP2018/009827, filed Mar. 13, 2018.

TECHNICAL FIELD

The present invention relates to a target member that is used when guiding a moving body to a target site.

BACKGROUND ART

Unmanned aircraft can be effectively utilized in disaster and security support and the like, but since there are various flight regulations on unmanned aircraft, securing a landing site is difficult. In particular, securing a landing site for unmanned aircraft is difficult in high density residential areas and the like.

In view of this, in recent years, GPS (Global Positioning System), targets installed on the landing sites, and the like have been used to land unmanned aircraft automatically.

As related technology, technologies have been disclosed in which an image of a target installed on the landing site is captured by an image capturing apparatus mounted in a unmanned aircraft, a positional relationship between the moving body and the target is computed based on the captured target image, and the unmanned aircraft is caused to automatically land on the landing site using the computation result. Also, the target that is used in Patent Document 1 has an outer figure arranged on the outermost side and a plurality of similar figures of different sizes that are smaller than the outer figure and similar in shape to the outer figure. Also, the similar figures are configured to be arranged inside the outer figure or other similar figures in decreasing order of size. See Patent Document 1, for example.

LIST OF RELATED ART DOCUMENTS

Patent Document

Patent Document 1: Japanese Patent Laid-Open Publication No. 2012-071645

SUMMARY OF INVENTION

Technical Problems

However, in Patent Document 1, the target is blurrily captured in the image captured from a high altitude, in the case of landing an unmanned aircraft from a high altitude. For this reason, when the target cannot be detected, the positional relationship between the unmanned aircraft and the target cannot be computed, based on the captured target image. Accordingly, in such cases, the unmanned aircraft cannot be automatically landed at the landing site using the computation result.

An example object of the present invention is to provide a target member that solves the above-described problems and accurately guides a moving body to a target site.

Solution to the Problems

A target member according to an example aspect of the present invention includes is a target member used when performing control for guiding a moving body to a target site, the target member being formed by using two or more different feature members that are set such that a shape of a target member image that corresponds to the target member captured by an image capturing apparatus that is mounted in the moving body changes according to a measurement distance that indicates a distance between the target member and the moving body.

Advantageous Effects of the Invention

As described above, according to the present invention, a moving body can be accurately guided to a target site.

EXAMPLE EMBODIMENT

As described above, various flight regulations apply to unmanned aircraft, thus making it is difficult to secure a landing site for unmanned aircraft in high density residential areas and the like. In view of this, utilization of the roof of emergency vehicles and the like as a landing site for unmanned aircraft has been proposed. However, even a skilled operator would have difficulty guiding and landing an unmanned aircraft in a small area such as the roof of an emergency vehicle. Thus, a method of performing control for accurately guiding an unmanned aircraft to a small landing site and landing the unmanned aircraft is called for.

Example Embodiment

Hereinafter, a target member according to an example embodiment of the present invention will be described, with reference to FIGS. 1 to 4.

Note that, hereinafter, the example embodiment will describe a method for performing control for guiding an unmanned aircraft to a landing site as an example, however the moving body that is subjected to guidance control is not limited to an unmanned aircraft, and the moving body may be a manned aircraft, a submarine, a spacecraft, for example.

[System Configuration]

Figure 1:
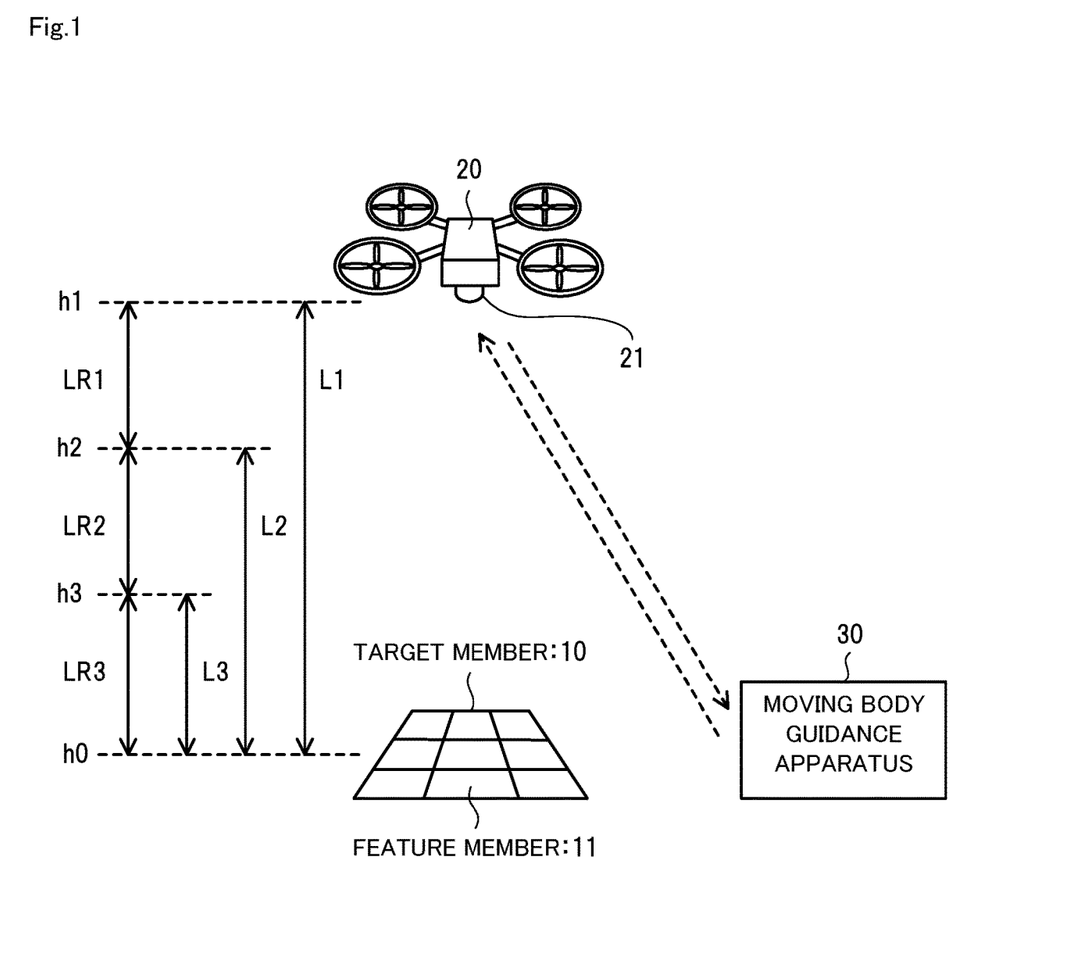
FIG. 1 is a diagram illustrating a relationship between a target member, a moving body, and a moving body guidance apparatus.

First, a target member 10 according to the present example embodiment and a system including the target member 10 will now be described using FIG. 1. FIG. 1 is a diagram illustrating a relationship between a target member, a moving body, and a moving body guidance apparatus.

The target member 10 according to the present example embodiment shown in FIG. 1 is formed by using two or more different feature members 11 that change a shape of a target member image that corresponds to the target member 10 captured by an image capturing unit (image capturing apparatus) 21 mounted in a moving body 20 according to a measurement distance indicating a distance between the target member 10 and the moving body 20.

The feature members 11 are formed such that a moving body guidance apparatus 30 determines that the image of a portion that corresponds to the feature members 11 included in the image captured from a set measurement distance is different from an image of a portion that corresponds to the feature members 11 captured from a distance other than the set measurement distance. Note that the moving body guidance apparatus 30 is an apparatus that performs control for guiding the moving body 20 using images captured by the image capturing unit 21 mounted in the moving body 20.

In this manner, in the present example embodiment, the shapes of the feature members 11 are set such that the shape of the target member image changes (blurs) according to the measurement distance. Accordingly, even the target member image changes (blurs), the moving body guidance apparatus 30 can guide the moving body 20 to the target site using the changed (blurred) target member image.

Figure 2:
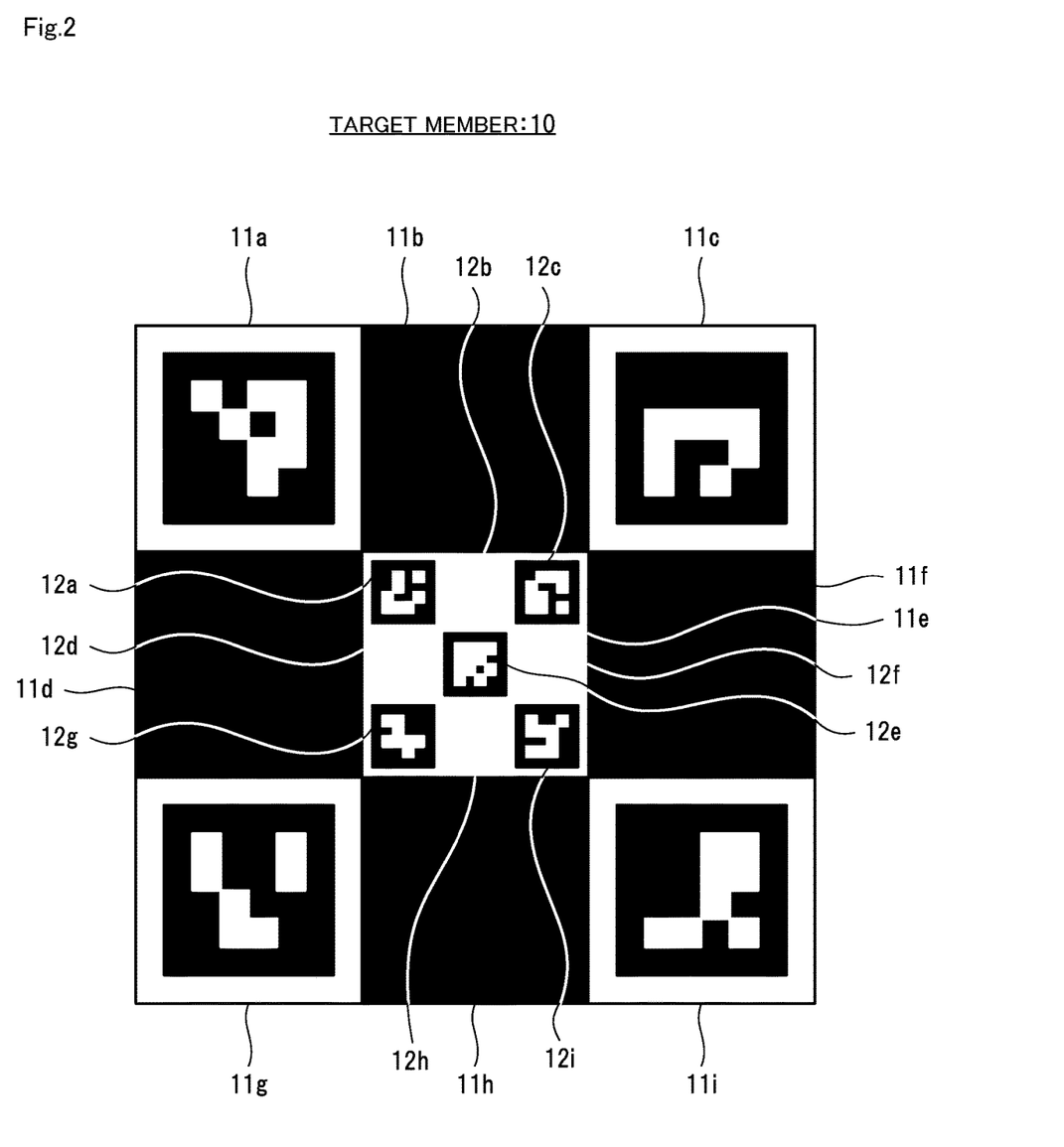
FIG. 2 is a diagram illustrating an example of a configuration of the target member.
Figure 3:
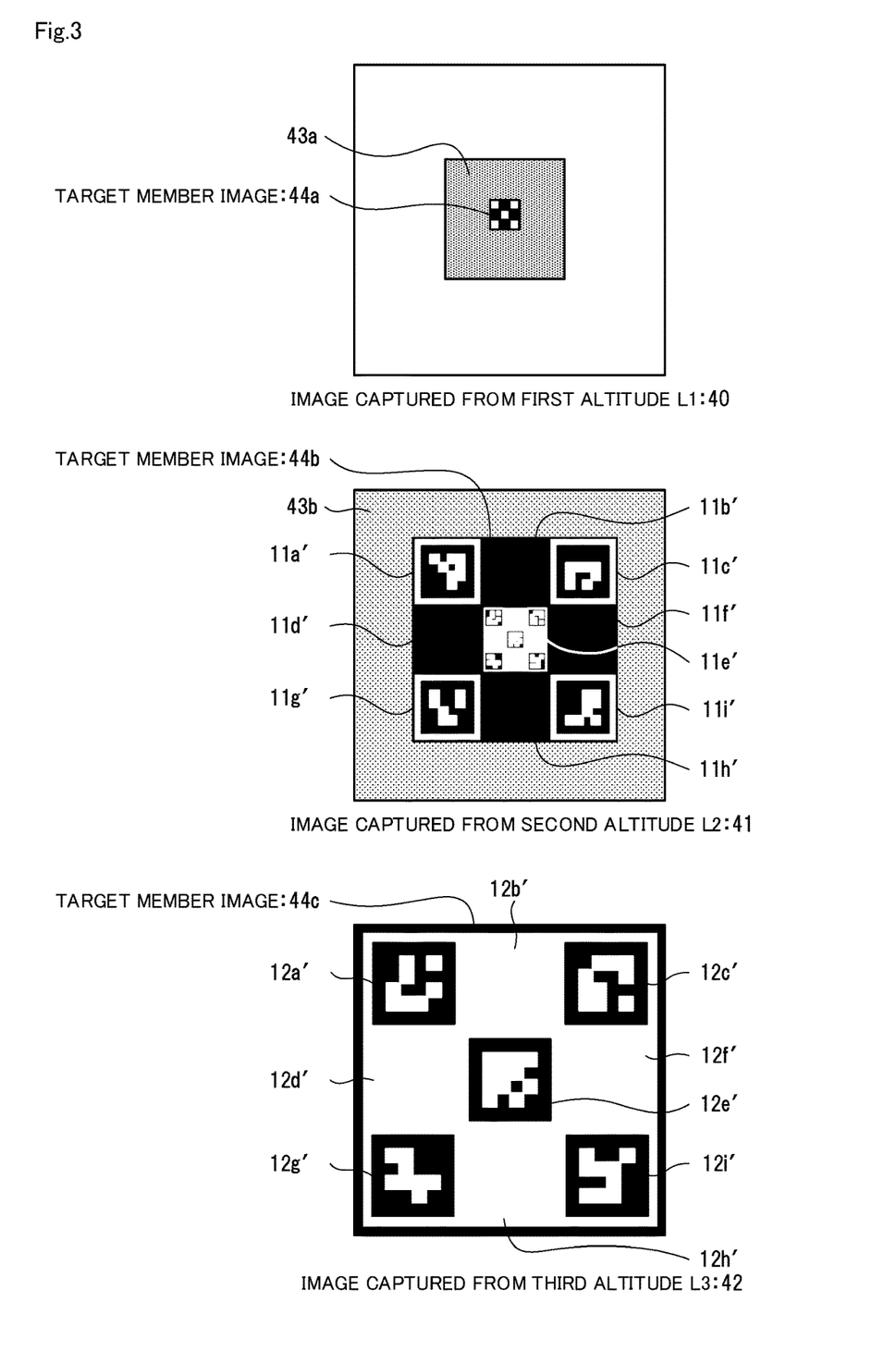
FIG. 3 is a diagram illustrating an example of a target member image for each altitude.
Figure 4:
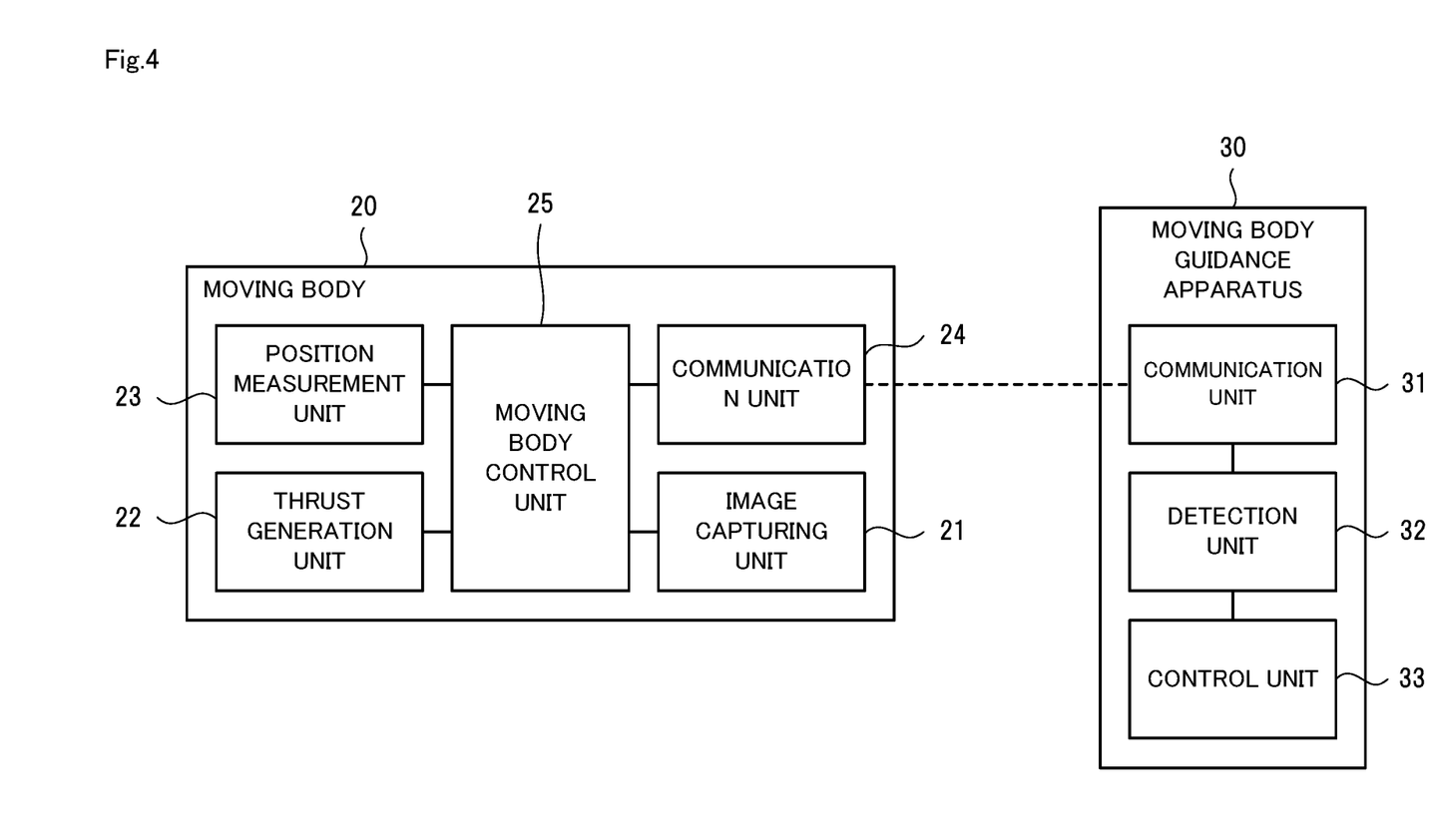
FIG. 4 is a diagram illustrating an example of a system including the target member.

Next, the target member 10 according to the present example embodiment and the system including the target member 10 will be described in detail using FIGS. 2, 3, and 4, in addition to FIG. 1. FIG. 2 is a diagram illustrating an example of a configuration of the target member. FIG. 3 is a diagram illustrating an example of a target member image for each altitude. FIG. 4 is a diagram illustrating an example of a system including the target member.

The target member 10 will now be described in detail.

In the present example embodiment, as shown in FIG. 2, the target member 10 is formed by using feature members 11a, 11b, 11c, 11d, 11e, 11f, 11g, 11h, and 11i.

The target member 10 includes the feature members 11b, 11d, 11f, and 11h (first feature members) whose shapes are set so as to correspond to a distance range LR1 (=distance L1–distance L2: first distance range) shown in FIG. 1. The target member 10 also includes the feature members 11a, 11c, 11g, and 11i (second feature members) whose shapes are set so as to correspond to a distance range LR2 (=distance L2–distance L3: second distance range) that is shorter than the distance range LR1. Furthermore, the target member 10 includes the feature member 11e (third feature member) whose shape is set so as to correspond to a distance range LR3 (=distance L3: third distance range) that is shorter than the distance range LR2.

The arrangement of the feature members will now be described.

In the present example embodiment, as shown in FIG. 2, the target member 10 is formed by arranging the feature members 11a, 11c, 11g, and 11i, and the feature members 11b, 11d, 11f, and 11h around the feature member 11e. Specifically, the feature member 11e is arranged in the center of the target member 10, and the feature members 11a, 11c, 11g, and 11i are arranged at the four corners of the target member 10. Also, the feature member 11b is arranged between the feature member 11a and feature member 11c, the feature member 11d is arranged between the feature member 11a and the feature member 11g, the feature member 11f is arranged between the feature member 11c and the feature member 11i, and the feature member 11h is arranged between the feature member 11g and the feature member 11i.

Note that only the feature members that correspond to the distance range LR1 or only the feature members that correspond to the distance range LR2 may be arranged around the feature member 11e.

Furthermore, in the present example embodiment, as shown in FIG. 2, the feature member 11e includes feature members 12a, 12b, 12c, 12d, 12e, 12f, 12g, 12h, and 12i (fourth feature members) that are smaller than the feature member 11e and arranged inside the feature member 11e. Specifically, the feature members 12a, 12c, 12g, and 12i are arranged at the four corners of the feature member 11e. The feature member 12e is arranged in the center of the feature member 11e. The feature member 12b is arranged between the feature member 12a and the feature member 12c, the feature member 12d is arranged between the feature member 12a and the feature member 12g, the feature member 12f is arranged between the feature member 12c and the feature member 12i, and the feature member 12h is arranged between the feature member 12g and the feature member 12i.

Also, the arrangement of the feature members 11 and 12 are not limited to the above-described arrangement. Furthermore, the feature members 11 and 12 need not be provided adjacent to the feature members 11 and 12.

The shapes of the feature members will now be described.

In the present example embodiment, the feature members 11a, 11c, 11e, 11g, and 11i are rectangles having a black and white pattern as shown in FIG. 2. The feature members 11b, 11d, 11f, and 11h are black rectangles.

In the present example embodiment, the feature members 12a, 12c, 12e, 12g, and 12i, that are arranged inside the feature member 11e, are rectangles having white-and-black patterns as shown in FIG. 2. The feature members 12b, 12d, 12f, and 12h are white rectangles. Also, the shapes of the feature members 12a to 12i may be similar to any of the shapes of feature members 11a to 11i, for example.

Note that the shapes of the target member 10 and the feature members 11 and 12 are not limited to the above-described shapes, colors, patterns, sizes, and so on.

Also, the shapes of the target member 10 and the feature members 11 and 12 may be formed by combining members, or formed by applying a common coating, a self-luminous coating, or a fluorescent coating. Furthermore, the shapes of the target member 10 and the feature members 11 may be formed by light-emitting patterns by using a light emitter such as an LED (light emitting diode) and an organic EL (electro luminescence). The control of the light-emitting pattern may be performed by a control unit that is provided in the target member 10, or may be performed by the moving body guidance apparatus 30.

In this manner, the shapes of the feature members 11 and 12 are formed using multiple colors. Furthermore, the shapes of the feature members 11 and 12 are formed such that, in the case where the images of the feature members 11 and 12 have been captured from a measurement distance that is longer than a set measurement distance, any one of the multiple colors, or colors based on two or more colors of the multiple colors will be dominant in the colors of the images of portions that correspond to the feature members 11 and 12 determined by the moving body guidance apparatus 30.

The target member image will now be described.

(1) When Captured in the Distance Range LR1 (from Height h1 to Height h2)

When the image capturing unit 21 captures the image of the target member 10 in the distance range LR1 (first altitude: high altitude) shown in FIG. 1, an image 40 such as shown in FIG. 3 is captured. The target site image 43a that corresponds to the entirety of the target site, and the target member image 44a that corresponds to the target member 10 are captured in the image 40.

The shapes of the feature members 11a, 11c, 11e, 11g, and 11i are set such that the feature member images corresponding to the feature members 11a, 11c, 11e, 11g, and 11i are captured as blurry white images due to an influence of the resolution of the image capturing unit 21 when the images of the feature members 11a, 11c, 11e, 11g, and 11i are captured in the distance range LR1. For this reason, the four corners and the center of the target member image 44a are captured as white images.

The shapes of the feature members 11b, 11d, 11f, and 11h are set so as to retain the black color even when the images thereof are captured in the distance range LR1. For this reason, the portions of the target member image 44a that correspond to the feature members 11b, 11d, 11f, and 11h are captured as black images.

(2) When Captured in the Distance Range LR2 (from Height h2 to Height h3)

When the image capturing unit 21 captures the image of the target member 10 in the distance range LR2 (second altitude: medium altitude) shown in FIG. 1, an image 41 such as shown in FIG. 3 is captured. In the image 41, the target site image 43b that corresponds to a portion of the target site, and the target member image 44b that corresponds to the target member 10 are captured.

The shapes of the feature members 11a, 11c, 11g, and 11i are set such that the moving body guidance apparatus 30 can determine the shapes of the feature members 11a, 11c, 11g, and 11i in the feature member images 11a', 11c', 11g', and 11i' that correspond to the feature members 11a, 11c, 11g, and 11i, respectively, when the images of the feature members 11a, 11c, 11g, and 11i are captured in the distance range LR2. For this reason, when the images of the feature members 11a, 11c, 11g, and 11i are captured in the distance range LR2, since the distance between the target member 10 and the moving body 20 is smaller than the distance range LR1, the resolution is improved, and therefore the feature member images 11a', 11c', 11g', and 11i' are sharply captured.

Next, the shape of the feature members 11e is set such that, when the image of the feature member 11e is captured in the distance range LR2, the images of feature members 12a, 12c, 12e, 12g, and 12i forming the feature member image 11e' that corresponds to the feature members 11e are captured as blurry white images due to the influence of the resolution of the image capturing unit 21. In other words, the shape of the feature member 11e' is set such that the feature member image 11e' need not be accurately determined by the moving body guidance apparatus 30 when captured in the distance range LR2.

Furthermore, the shapes of the feature members 11b, 11d, 11f, and 11h are set so as to retain the black color even when the images thereof are captured in the distance range LR2. For this reason, the portions of the target member image 44a that correspond to the feature members 11b, 11d, 11f, and 11h are captured as black images.

(3) When Captured in the Distance Range LR3 (from Height h3 to Height h0)

When the image capturing unit 21 captures the image of the target member 10 in the distance range LR3 (third altitude: low altitude) shown in FIG. 1, an image 42 such as shown in FIG. 3 is captured. In the image 42, the target member image 44c that corresponds to the feature member 11e is captured. Here, since the target member image 44c is obtained by capturing the image of the target member 10 at a low altitude, only the feature member 11e is captured in the target member image 44c instead of the entirety of the target member 10.

The shape of the feature member 11e is set such that the moving body guidance apparatus 30 can determine the shapes of the feature members 12a, 12c, 12e, 12g, and 12i in the feature member images 12a', 12c', 12e', 12g', and 12i' that correspond to the feature members 12a, 12c, 12e, 12g, and 12i when the image of the feature member 11e is captured in the distance range LR3. When the images of the feature members 12a, 12c, 12e, 12g, and 12i are captured in the distance range LR3, since the distance between the target member 10 and the moving body 20 are smaller than the distance range LR2, the resolution is improved, and therefore, the feature member images 12a', 12c', 12e' 12g', and 12i' are sharply captured.

The shapes of the feature members 12b, 12d, 12f, and 12h are set so as to retain the white color even when the images thereof are captured in the distance range LR3. For this reason, the portions of the target member image 44a that correspond to the feature members 12b, 12d, 12f, and 12h are captured as white images.

The moving body 20 will now be described in detail.

When the moving body 20 is a so-called drone such as a multicopter having multiple rotors, the moving body 20 includes the image capturing unit 21, a thrust generation unit 22, a position measurement unit 23, a communication unit 24, and a moving body control unit 25, as shown in FIG. 4.

The image capturing unit 21 is, for example, a video camera, a digital camera, or the like that captures the image of the target member 10. The thrust generation unit 22 includes a propeller that generates thrust and an electric motor linked to the propeller. Furthermore, the units of the thrust generation unit 22 are controlled by the moving body control unit 25 based on control information. The position measurement unit 23 measures the current position (latitude and longitude) and altitude (measurement distance) of the moving body 20. The position measurement unit 23 receives GPS signals from a satellite, for example, and measures the current position and altitude based on the received GPS signals.

The communication unit 24 receives signals including control information transmitted from the moving body guidance apparatus 30, or transmits signals including measurement distances, images, and so on that are to be transmitted to the moving body guidance apparatus 30, between the moving body 20 and the moving body guidance apparatus 30. The communication unit 24 is realized by a communication device for wireless communication, for example.

The moving body control unit 25 calculates the speed of the moving body 20 based on the current position and the measurement distance measured by the position measurement unit 23. Also, the moving body control unit 25 transmits, to the moving body guidance apparatus 30, the calculated speed, the current position and measurement distance, and the image, as state information through the communication unit 24. Furthermore, the moving body control unit 25 controls the speed, the measurement distance, and the traveling direction of the moving body 20 by adjusting the thrust of the thrust generation unit 22.

Furthermore, the moving body 20 can fly in the air along a set course while confirming the current position, for example. The moving body 20 can also fly in the air according to instructions from the moving body guidance apparatus 30. The moving body 20 also has a function of automatically returning to the target site where the target member 10 is installed and that has been stored in advance, even in the case such as where the instructions from the moving body guidance apparatus 30 stop being received, the moving body 20 malfunctions, the remaining capacity of battery (not shown) that is mounted in the moving body 20 runs low.

The moving body guidance apparatus 30 will now be described in detail.

A communication unit 31 receives signals including control information including the measurement distance and the image and so on transmitted from the moving body 20, or transmits signals including control information and the like to the moving body 20, between the moving body guidance apparatus 30 and the moving body 20. The communication unit 31 is realized by, for example, a communication device for wireless communication.

Upon acquiring the measurement distance and the image from the communication unit 31, the detection unit 32 detects the target member image from the obtained image based on the acquired measurement distance and feature detection information.

The feature detection information is information generated by detecting the above-described features of the target member images 44 from the target member images 44 captured from various measurement distances in advance, and associating the detected features with the distance ranges, and is stored in a storage unit (not shown). In addition, if detection is performed using pattern matching processing or the like, a configuration is also possible in which the target member images 44 captured from various measurement distances in advance are taken as template images, and the feature detection information is formed by associating the template images and the distance ranges with each other. Note that the storage unit may also be provided inside the moving body guidance apparatus 30 or the detection unit 32, or outside the moving body guidance apparatus 30.

The features of the target member image 44 include the shape, color and pattern of the target member image 44 that change according to the measurement distance, the number of the pixels (or the area) that forms the target member image 44, the occupied range thereof, and so on. Note that the reason why the target member image 44 changes according to the measurement distance is that the numbers of the pixels forming the target member images 44a, 44b, and 44c or the resolutions with respect to the target member images 44a, 44b, and 44c change.

As shown in FIG. 3, if the measurement distance is long, the range over which the target member image 44a occupies the image 40 (occupied range) is small. In contrast, as shown in FIG. 3, if the measurement distance is short, the range over which the target member image 44b occupies the image 41 increases. As shown in FIG. 3, if the measurement distance is even shorter, the target member image 44c (feature member image 11e') occupies the image 42. This indicates that the number of pixels required to form the target member image 44 changes according to the measurement distance.

In other words, when the measurement distance is in the distance range LR1 (when the altitude is high), the number of pixels required to represent the target member image 44a decreases, and thus the target member image 44a is captured as a blurred image such as shown in FIG. 3. In contrast, when the measurement distance is in the distance range LR2 (when the altitude is intermediate), the number of pixels required to form the target member image 44b increases, and thus the target member image 44b is captured more sharply than the target member image 44a. Furthermore, when the measurement distance is in the distance range LR3 (when the altitude is low), the number of pixels required to form the target member image 44c further increases, and thus the image capturing unit 21 can sharply capture the feature member image 11e'.

Note that at least one of the shape, color, pattern, area, and occupied range, or a combination thereof may be used as the features of the target member image 44.

The method for detecting the target member image will now be described in detail. When the measurement distance is in the distance range LR1, the detection unit 32 detects the target member image 44a formed by the multiple feature member images 11a' to 11i' from the image 40 captured in the distance range LR1. In other words, upon acquiring the measurement distance and the image 40 from the moving body 20, the detection unit 32 acquires the features associated with the distance range LR1 by referencing the feature detection information using the distance range LR1 that includes the acquired measurement distance. Subsequently, the detection unit 32 detects the target member image 44a in the image 40 using the acquired features relating to the distance range LR1. For example, the detection unit 32 uses at least one of the template image, shape, color, pattern, area, and occupied range of the target member image, that are associated with the distance range LR1, or a combination thereof, to detect the target member image 44a that matches these features from the image 40.

In addition, when the measurement distance is in the distance range LR2, the detection unit 32 detects the target member image 44b formed by the multiple feature member images 11a' to 11i' from the image 41 that has been captured in the distance range LR2. In other words, upon acquiring the measurement distance and the image 41 from the moving body 20, the detection unit 32 acquires the features associated with the distance range LR2 by referencing the feature detection information using the distance range LR2 that includes the acquired measurement distance. Subsequently, the detection unit 32 uses the acquired features associated with the distance range LR2 to detect the target member image 44b in the image 41. For example, the detection unit 32 uses at least one of the template image, shape, color, pattern, area, and occupied area of the target member image, that are associated with the distance range LR2, or the combination thereof, to detect the target member image 44b that matches to these features from the image 41.

Furthermore, when the measurement distance is the distance range LR3, the detection unit 32 detects the features of the target member image 44c formed by the multiple feature member images 12a' to 12i' from the image 42 that has been captured in the distance range LR3. In other words, upon acquiring the measurement distance and the image 42 from the moving body 20, the detection unit 32 acquires the features associated with the distance range LR3 by referencing the feature detection information using the distance range LR3 that includes the acquired measurement distance. Subsequently, the detection unit 32 uses the features associated with the acquired distance range LR3 to detect the target member image 44c in the image 42. For example, the detection unit 32 uses at least one of the template image, shape, color, pattern, area, and occupied area of the target image, that are associated with the distance range LR3, or the combination thereof, to detect the target member image 44c that matches to these features from the image 42.

Next, the control unit 33 generates control information for performing guidance control of the moving body 20. This control information is transmitted to the moving body 20 through the communication unit 31. Also, the control information is information for controlling the thrust generation unit 22 included in the moving body 20.

This will now be described in detail. If the control unit 33 detects the target member image 44a, the control unit 33 generates control information for moving the moving body 20 to a position at or lower than the height h2 shown in FIG. 1, for example. Furthermore, if the control unit 33 detects the target member image 44b, the control unit 33 generates control information for moving the moving body 20 to a position at the height h3 shown in FIG. 1, for example. Furthermore, if the control unit 33 detects the target member image 44c (the feature member image 11e'), the control unit 33 generates control information for moving the moving body 20 to a position at the height h0 shown in FIG. 1, for example.

Effects of Embodiment

As described above, according to the present example embodiment, since the shapes of the feature members 11, 12 are set such that the shape of the target member image 44 changes according to the measurement distance, even when the target member image 44 changes, the moving body guidance apparatus 30 can guide the moving body 20 to the target site by using the changed target member image 44.

In addition, using the target member 10 described in the present example embodiment makes it possible to perform guidance control to the target site to guide the moving body 20 to the target site without using GPS or the like. Furthermore, it is possible to guide the moving body 20 to the target site more accurately than when GPS is used. In particular, it is effective when control is to be performed to guide the moving body 20 accurately to a small target site.

Note that the functions of the above-described detection unit 32 and the control unit 33 can be provided in the moving body control unit 25 included in the moving body 20.

[Supplementary Note]

With respect to the above-described example embodiment, the following supplementary notes will be further disclosed. Some or all of the above-described embodiments can be represented by (Supplementary note 1) to (Supplementary note 7) described below, but are not limited to the following.

(Supplementary Note 1)

A target member that is used when performing control for guiding a moving body to a target site, in which the target member is formed by using two or more different feature members that are set such that a shape of a target member image that corresponds to the target member captured by an image capturing apparatus that is mounted in the moving body changes according to a measurement distance that indicates a distance between the target member and the moving body.

(Supplementary Note 2)

The target member according to supplementary note 1, in which the shapes of the feature members are set such that, in a moving body guidance apparatus that performs control for guiding the moving body using an image captured by the image capturing apparatus that is mounted in the moving body, the moving body guidance apparatus determines that a feature member image that corresponds to the feature members included in the image captured at the measurement distance that has been set, and a feature member image that corresponds to the feature members captured at a distance other than the set measurement distance are different from each other.

(Supplementary Note 3)

The target member according to supplementary note 2, in which the shapes of the feature members are formed such that, when captured at a measurement distance longer than the set measurement distance, any of the plurality of colors, or a color based on two or more colors of the plurality of colors is dominant in a color of a portion of the image that corresponds to the feature members and that is determined by the moving body guidance apparatus.

(Supplementary Note 4)

The target member according to any one of supplementary notes 1 to 3, in which the target member is formed by arranging a first feature member that is formed in a shape that corresponds to the first distance range and a second feature member that is formed in a shape that corresponds to a second distance range that is shorter than the first distance range.

(Supplementary Note 5)

The target member according to supplementary note 4, in which the target member is formed by arranging a third feature member whose shape is set so as to correspond to a third distance range that is shorter than the second distance range.

(Supplementary Note 6)

The target member according to supplementary note 5, in which the target member is formed by arranging the first feature member, or the second feature member, or both the first feature member and the second feature member around the third feature member.

(Supplementary Note 7)

The target member according to supplementary note 5 or 6, in which the third feature member is formed by arranging one or more fourth feature members that are smaller than the third feature member, inside the third feature member.

Although the present invention has been described above with reference to the embodiments, the present invention is not limited to the above-described embodiments. Various modifications that can be understood by a person skilled in the art may be made to the configuration and the details of the present invention within the scope of the invention.

INDUSTRIAL APPLICABILITY

As described above, according to the present invention, it is possible to accurately guide a moving body to a target site. The present invention is applicable in a field in which a moving body is to be guided to a target site.

REFERENCE SIGNS LIST

10 Target member
11, 11a, 11b, 11c, 11d, 11e, 11f, 11g, 11h, 11i Feature member
12, 12a, 12b, 12c, 12d, 12e, 12f, 12g, 12h, 12i Feature member
20 Moving body
21 Image capturing unit
22 Thrust generation unit
23 Position measurement unit
24 Communication unit
25 Moving body control unit
30 Moving body guidance apparatus
31 Communication unit
32 Detection unit
33 Control unit
40, 41, and 42 Image
43, 43a, 43b Target site image
44, 44a, 44b, 44c Target member image
11a', 11b', 11c', 11d', 11e', 11f, 11g', 11h', 11i' Feature member
12a', 12b', 12c', 12d', 12e', 12f, 12g', 12h', 12i' Feature member

The invention claimed is:

1. A target member that is used when performing control for guiding a moving body to a target site, wherein the target member is formed by using two or more different feature members that are set such that a shape of a target member image that corresponds to the target member captured by an image capturing apparatus that is mounted in the moving body changes according to a set measurement distance between the target member and the moving body, wherein shapes of the feature members are set such that, in a moving body guidance apparatus that performs control for guiding the moving body using an image captured by the image capturing apparatus that is mounted in the moving body, the moving body guidance apparatus determines that a feature member image that corresponds to the feature members included in the image captured at the measurement distance that has been set, and a feature member image that corresponds to the feature members captured at a distance other than the set measurement distance, are different from each other, and wherein the shapes of the feature members are formed such that, when captured at a measurement distance longer than the set measurement distance, any of a plurality of colors, or a color based on two or more colors of the plurality of colors, is dominant in a color of a portion of the image that corresponds to the feature members and that is determined by the moving body guidance apparatus.

2. The target member according to claim 1,
wherein the target member is formed by arranging a first feature member that is formed in a shape that corresponds to a first distance range and a second feature member that is formed in a shape that corresponds to a second distance range that is shorter than the first distance range.

3. The target member according to claim 2,
wherein the target member is formed by arranging a third feature member having a shape that is set to correspond to a third distance range that is shorter than the second distance range.

4. The target member according to claim 3,
wherein the target member is formed by arranging the first feature member, or the second feature member, or both the first feature member and the second feature member around the third feature member.

5. The target member according to claim 3,
wherein the third feature member is formed by arranging one or more fourth feature members that are smaller than the third feature member, inside the third feature member.

* * * * *